(12) United States Patent
Boyl-Davis et al.

(10) Patent No.: US 6,843,328 B2
(45) Date of Patent: Jan. 18, 2005

(54) FLEXIBLE TRACK DRILLING MACHINE

(75) Inventors: Theodore Martin Boyl-Davis, Everett, WA (US); James N. Buttrick, Jr., Seattle, WA (US); Roger A. Gage, Marysville, WA (US); Darrell D. Jones, Mill Creek, WA (US); Kostandinos D. Papanikolaou, Southfield, MI (US)

(73) Assignee: The Boeing Company, Chicago, IL (US)

(*) Notice: Subject to any disclaimer, the term of this patent is extended or adjusted under 35 U.S.C. 154(b) by 8 days.

(21) Appl. No.: 10/016,524

(22) Filed: Dec. 10, 2001

(65) Prior Publication Data

US 2003/0116331 A1 Jun. 26, 2003

(51) Int. Cl.[7] .................................................. E20B 19/00
(52) U.S. Cl. .............................. 173/32; 173/31; 173/37
(58) Field of Search .............................. 173/32, 31, 37; 227/110, 111; 269/1, 21; 83/745, 744, 743

(56) References Cited

U.S. PATENT DOCUMENTS

| | | | |
|---|---|---|---|
| 3,575,364 A | | 4/1971 | Frederick |
| 3,592,095 A | * | 7/1971 | Passa et al. ................. 83/267 |
| 3,935,985 A | * | 2/1976 | Prudhomme et al. ......... 228/45 |
| 3,990,689 A | * | 11/1976 | Eklund, Sr. ................. 269/21 |
| 4,599,018 A | | 7/1986 | Woods |
| 4,761,876 A | * | 8/1988 | Kosmowski ................. 483/1 |
| 4,850,763 A | | 7/1989 | Jack et al. |
| 5,323,962 A | * | 6/1994 | Jassby et al. ............. 238/10 R |
| 5,468,099 A | * | 11/1995 | Wheetley et al. .......... 408/1 R |
| 6,378,197 B1 | * | 4/2002 | Hansen ....................... 29/823 |
| 6,467,385 B1 | * | 10/2002 | Buttrick et al. ............... 83/745 |
| 6,494,307 B1 | * | 12/2002 | Kozak et al. ............. 198/465.1 |

FOREIGN PATENT DOCUMENTS

DE        198 34 702 A        2/2000

* cited by examiner

Primary Examiner—Scott A. Smith
Assistant Examiner—Brian Nash
(74) Attorney, Agent, or Firm—Alston & Bird LLP (57) ABSTRACT

A flexible track drilling machine employs a pair of rails that are flexible in one direction to conform to a non-flat workpiece surface and are substantially stiff in a direction parallel to the workpiece surface. The rails are attached to the workpiece by vacuum cups spaced along each rail. An X-axis carriage is slidably mounted on the rails by rollers mounted on flexible spring plates affixed to the carriage. A drill or other device to be positioned is mounted on a Y-axis carriage that is slidably connected to the X-axis carriage. The three-dimensional surface of the workpiece is mathematically transformed into a two-dimensional flat pattern, and the positioning of the carriages is controlled based on the flat pattern.

16 Claims, 7 Drawing Sheets

FLEXIBLE TRACK DRILLING MACHINE

FIELD OF THE INVENTION

The present invention relates to machines for drilling or performing other work operations on large workpieces configured as simple- or compound-contoured panels or the like, such as wing and fuselage sections for aircraft. The invention relates more particularly to a flexible track machine and method for positioning a working module such as a drill, marking device, or the like, relative to a workpiece by traversing the module along a track mounted on and indexed to the workpiece.

BACKGROUND OF THE INVENTION

The problem of accurately drilling holes in large workpieces such as aircraft wing and fuselage panels and other types of structures has been an ongoing challenge in the aircraft industry as well as other industries, and one for which a completely satisfactory solution applicable to a wide range of workpiece configurations has not heretofore been provided. Large fixed-monument machines such as five-axis drilling machines can be used for some types of workpieces, but these machines are quite expensive to procure and operate. In contrast, a relatively low-cost solution to the above-noted problem that has been developed by the assignee of the present application and others is to mount an automated drill or other working module on a track that is mounted to the workpiece. The drill or module is supported on a carriage that travels along the track, which is formed by a pair of parallel rails mounted on the workpiece. For examples of such devices, see U.S. Pat. No. 4,850,763, assigned to the assignee of the present application and incorporated herein by reference, and U.S. Pat. No. 3,575,364.

In the above-noted patents, however, the embodiments illustrated and described were applied to workpieces that did not have compound-contoured surfaces. As used herein, the term "compound-contoured" is used to denote a surface having curvature in more than one direction. On such a compound-contoured surface, it is not possible in general to lay a pair of straight, flexible rails such that the rails conform to the surface contour and are the same distance apart at all points along the rails. Thus, the surface of a sphere is an example of a compound-contoured surface, because in the general case the spacing between a pair of flexible rails laid on the surface will vary. In contrast, a circular cylinder does not have a compound-contoured surface, because the rails can be laid in either circumferential, axial, or helical directions and the spacing between them can be constant. In U.S. Pat. No. 3,575,364 noted above, a pair of flexible rails are mounted in the circumferential direction around a circular cylindrical workpiece. It will be appreciated that the rails can be perfectly parallel in such an arrangement, because the cylindrical surface is a simple-contoured surface. The rails in the '364 patent are made flexible so that they can be conformed to a variety of surfaces, but even such flexible rails cannot be made exactly the same distance apart at all points along the rails when they are mounted on a compound-contoured surface. Furthermore, rails mounted along two different paths on a compound-contoured surface will twist differently from each other because of the different directions of the surface normals along the two paths. This can make it difficult to traverse a carriage along the rails and maintain good accuracy of carriage positioning.

It is possible to mount a pair of spaced rails on a compound-contoured surface such that the rails are the same distance apart at all points along the rails, but only by custom-designing the rails for the particular workpiece surface. If such custom-designed rails were used on a differently contoured surface, they would not be the same distance apart at all points. While it is highly desirable to be able to traverse a drill or other machine component on a pair of rails mounted on a compound-contoured surface, it is also desirable to be able to use the same apparatus on a wide variety of surface contours, including simple- and compound-contoured surfaces.

SUMMARY OF THE INVENTION

The above needs are addressed and other advantages are achieved by the present invention, which provides a flexible track machine for accurately positioning a drill or other machine component that can be used on simple- and compound-contoured surfaces of various configurations. The machine has no rigid monument or foundation; rather, the workpiece itself supports the machine. More particularly, a pair of rails are mounted on the workpiece, and the drill or other machine component is traversed along the rails. The above-noted difficulties associated with laying rails on compound-contoured surfaces would seem to counsel making the rails flexible in all bending directions so that they act as splines, and fixing the location of each rail at a plurality of hard points spaced along the rail such that the rails are precisely parallel. The present invention, however does not take this approach.

In accordance with the present invention, a pair of spaced flexible rails are mounted on the workpiece such that the rails extend along an X-axis direction along which the drill or other machine component is to be traversed. The rails are placed approximately parallel but, as noted, will not be precisely parallel when the surface has a compound curvature. An X-axis carriage is slidably mounted on the rails and supports the drill or other machine component. The X-axis carriage is driven using only one of the rails as a reference rail to set the X-axis location of the carriage. The other rail is not used as a reference but is used only to react forces on the carriage in a Z-axis direction (i.e., normal to the workpiece surface), such as from drill thrust. The rails are relatively stiff in bending about a first bending axis and relatively flexible in bending about a second bending axis orthogonal to the first bending axis. This is accomplished in preferred embodiments of the invention by configuring the rails as elongate plate-like structures having widths much greater than their thickness. The rails are mounted on the workpiece with the major surfaces of the plate-like rails substantially parallel to the workpiece surface, such that the first bending axis is substantially normal to the workpiece surface (parallel to the Z-axis) and the second bending axis is substantially parallel to the workpiece surface (parallel to the Y-axis). The rails thus are able to bend and twist to substantially follow the surface normals of the workpiece surface. In this manner, the rails are able to position the X-axis carriage so that it reflects the surface normal of the workpiece at any given position along the rails.

The machine component can be a drill, as noted above, but can also be other types of devices, including but not limited to a marking device for applying markings on the workpiece, or a welding device. In any case, preferably the machine component is mounted on the X-axis carriage via a Y-axis carriage that in turn is mounted on the X-axis carriage so as to be translatable along the Y axis transverse to the direction along which the X-axis carriage travels along the rails. Thus, the machine component is independently translatable in each of two axes.

The invention thereby enables the three-dimensional positioning of a drill or the like relative to the workpiece to be accomplished by numerical programming in only two axes, i.e., the X- and Y-axes, since the rails and X-axis carriage act to automatically position the drill normal to the workpiece surface when the drill is suitably mounted on the X-axis carriage. In accordance with a preferred embodiment of the invention, a mathematical definition of the three-dimensional surface of the workpiece is transformed into a two-dimensional flat pattern, and numerical programming of a controller for the X-axis and Y-axis carriage drive systems is performed in the two axes of the flat pattern. Thus, programming is considerably simplified compared with conventional multi-axis machines requiring programming in three or more axes.

The rails can be attached to the workpiece in various manners. In one embodiment, a plurality of spaced attachment devices are mounted on the workpiece and the rails are releasably attached to the attachment devices. The attachment devices can attach to the workpiece by vacuum.

The X-axis carriage preferably is mounted on the rails by flexible mounts that can accommodate varying bending and/or twisting that occurs along each rail from one end to the other when mounted on a compound-contoured surface. The flexible mounts can comprise plate-shaped springs affixed to the X-axis carriage and having rail-engaging rollers mounted thereon, or bearing cars coupled to the X-axis carriage by spherical bearings and having the rollers mounted thereon.

In the preferred embodiment, the flexible mounts comprise plate-shaped springs that are rigidly affixed to the X-axis carriage near their middles such that opposite ends of each spring are supported in a cantilever fashion from the X-axis carriage. The rail-engaging rollers are mounted on the cantilevered ends of the springs. The springs preferably have a width that is smallest in the middle and greater at the ends so that the spring preferentially twists at the middle rather than at the ends.

The X-axis drive device preferably employs a pinion gear mounted on one cantilevered end of the plate-shaped spring that is disposed above one of the rails (i.e., the reference rail). The pinion gear engages a rack mounted on the reference rail. To control the height of the pinion gear relative to the rack so that the height is substantially constant as the X-axis carriage is driven along the reference rail, the rotational axis of the pinion gear preferably lies in the same plane as the rotational axes of a pair of rollers mounted on the end of the spring. The rollers preferably are V-groove rollers that define V-shaped grooves in which the opposite edges of the rail are engaged, thus preventing movement of the rollers relative to the rail in the direction generally normal to the workpiece surface.

In a preferred embodiment of a flexible track drilling machine in accordance with the invention, a pre-load force is applied between the X-axis carriage and the surface of the workpiece prior to drilling a hole, a normal component of the pre-load force having a greater magnitude than a normal component of reaction force on the X-axis carriage caused by thrust of the drill during drilling. This pre-load force helps stabilize the machine and takes up any play in the Z-direction that may exist in the connections between the attachment devices, rails, carriage, etc. Preferably, the pre-load force is applied by a pressure foot attached to the drill. The pressure foot preferably is connected with the drill such that the reaction force caused by drill thrust is reacted through the pressure foot so as to reduce the pre-load force between the pressure foot and the workpiece.

BRIEF DESCRIPTION OF THE DRAWINGS

The above and other objects, features, and advantages of the invention will become more apparent from the following description of certain preferred embodiments thereof, when taken in conjunction with the accompanying drawings in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
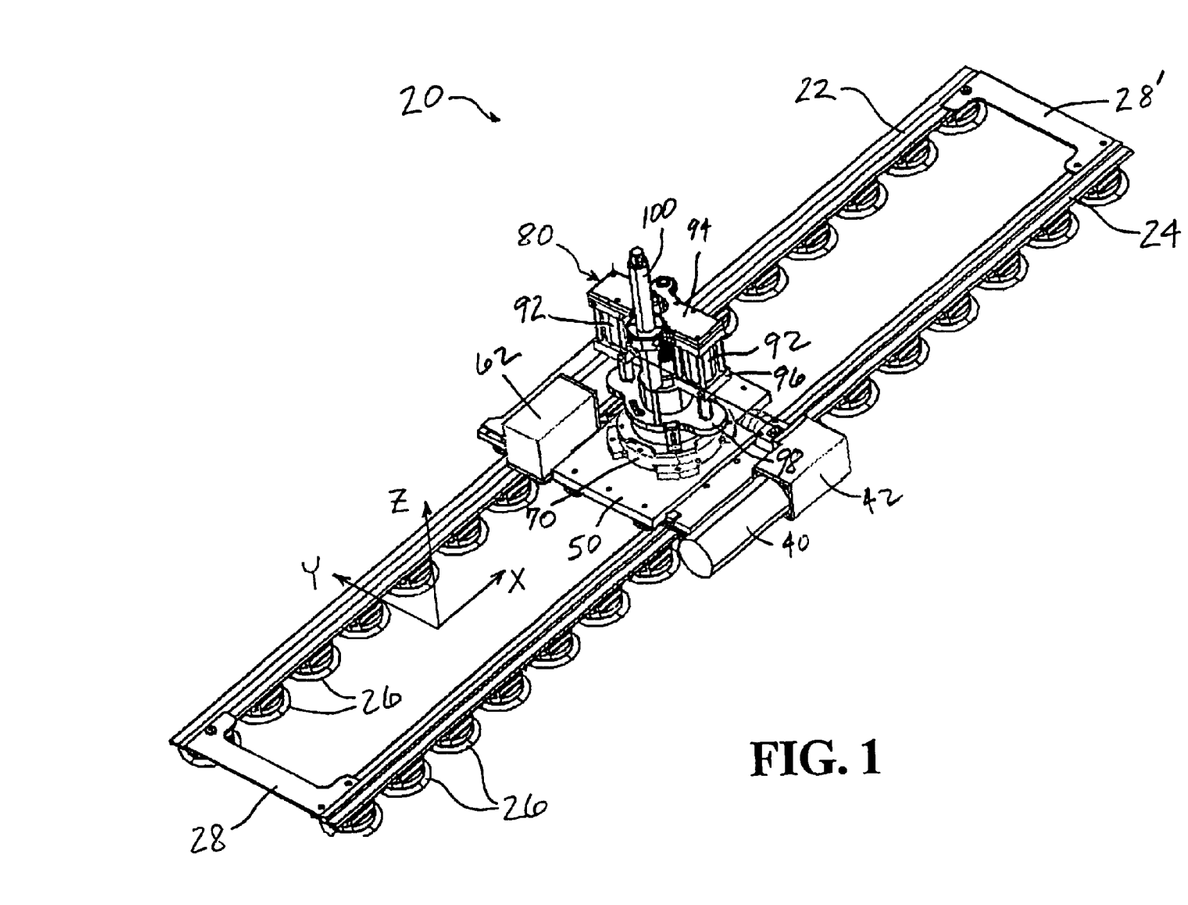
FIG. 1 is a perspective view of a flexible track drilling machine in accordance with one preferred embodiment of the invention.

With reference to FIG. 1, a machine 20 in accordance with one preferred embodiment of the invention is shown. The machine comprises a pair of rails 22, 24 to which a plurality of attachment devices, preferably in the form of vacuum cup assemblies 26, are releasably affixed at spaced intervals along the length of each rail. The rails 22, 24 preferably have a width substantially greater than their thickness such that they are substantially stiffer in bending about an axis that extends in the thickness direction than they are about an axis that extends in the width direction. The rails are oriented approximately parallel to each other, although the lateral spacing between the rails can vary when the rails are mounted on a compound-contoured workpiece surface. Preferably, the rails are rigidly affixed to each other at only one end by a connecting member 28, which fixes the spacing between the rails at that end. At other locations along the rails, the spacing between the rails can vary as noted. There can be another connecting member 28' at the opposite end of the rails, but this connecting member 28' provides a "floating" connection that allows the spacing between the rails to adjust as needed depending on the contour of the workpiece surface.

The widths of the rails extend substantially parallel to the surface of the workpiece when the vacuum cups are attached to the workpiece surface. Because the rails are able to easily bend about the widthwise directions and to twist about their longitudinal axes, the rails flex and twist as needed to substantially follow the surface of the workpiece and the vacuum cup assemblies maintain each rail at a substantially constant distance from the surface of the workpiece. In this manner, the major surfaces of the rails are substantially perpendicular to the surface normal of the workpiece at any point along each rail.

Mounted on the rails is an X-axis carriage 30 (FIGS. 2–5) that slides along the rails by virtue of rollers 32 that are mounted on the carriage 30 and engage the rails. The X-axis carriage 30 in the illustrated embodiment comprises a plate-shaped member. The rollers 32 are mounted along each of the opposite side edges of the carriage. More particularly, spring plates 34 and 36 (best seen in FIG. 5) are attached to the carriage 30 adjacent to a lower surface thereof at each of the opposite side edges of the carriage. The spring plates are affixed to the X-axis carriage at locations 37 (FIG. 5) spaced inwardly from the opposite ends of the spring plates, such that each spring plate has two opposite end portions that are cantilevered from the carriage. The rollers 32 are mounted on these cantilevered end portions of the spring plates 34, 36. There are two opposing rollers 32 mounted on each cantilevered end portion of each of the spring plates 34, 36. Each rail 22, 24 is received between the opposing rollers 32. The rails 22, 24 preferably have V-shaped edges engaged by the rollers, and the rollers are V-groove rollers having V-shaped grooves that receive the V-shaped edges of the rails. The rollers thus prevent relative movement between the rollers and rails in the direction along the rotational axes of the rollers, which axes are substantially normal to the workpiece surface.

Figure 5:
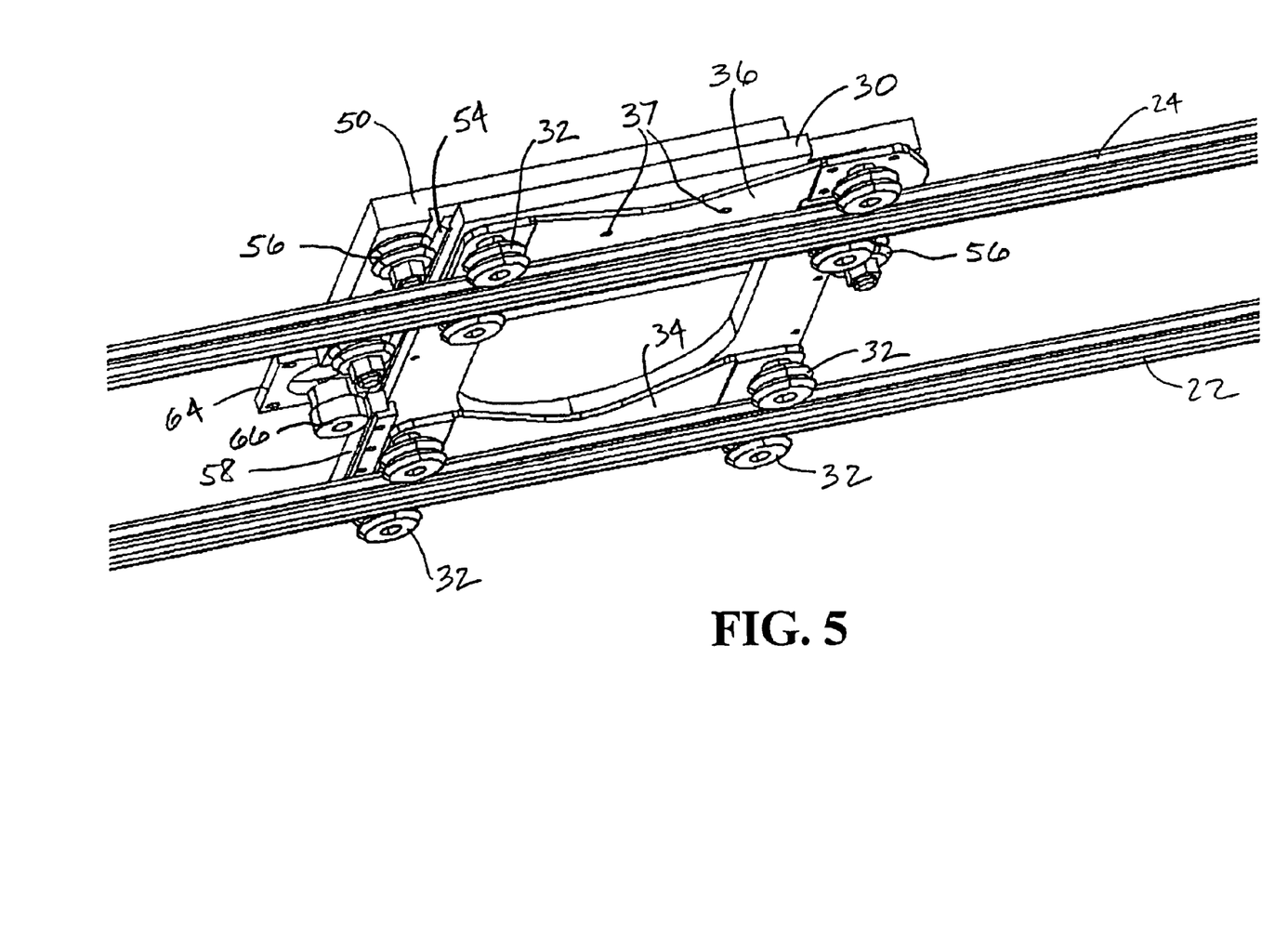
FIG. 5 is a perspective view similar to FIG. 4, generally from below.

The spring plates 34, 36 on which the rollers are mounted flex and twist as needed (i.e., dictated by the contour of the workpiece surface as the X-axis carriage traverses the rails) to allow a limited degree of relative movement to occur between the X-axis carriage 30 and the rollers 32. This is facilitated by making the spring plates relatively narrow at their middles and wider at their ends, so that the plates preferentially bend and twist at the middle rather than at the ends where the rollers are mounted. Thus, a limited degree of relative movement can occur between the X-axis carriage and the rails 22, 24. The net result is that the flexible track machine 20 enables the X-axis carriage to traverse the rails along the X-axis (i.e., the axis parallel to the length direction of the rails) even though the rails may be bending and twisting in somewhat different ways relative to each other. In effect, the rails 22, 24 conform to the contour of the workpiece surface and thus approximate a normal to the surface at any point along the path defined by the rails. Consequently, a reference axis of the carriage (in the illustrated embodiment, an axis normal to the plane of the carriage) is maintained substantially normal to the workpiece surface at any position of the carriage along the rails.

A rack 38 (FIGS. 2 and 3) for a rack and pinion arrangement is mounted along the surface of the rail 24 that faces the spring plate 36. A motor 40 and associated gearbox 42 are mounted on the spring plate 36. An output shaft from the gearbox 42 has a pinion gear 44 mounted thereon, and the spring plate 36 includes a window 46 (FIG. 4) that the pinion gear extends through to engage the rack 38 on the rail 24. Thus, rotation of the pinion gear 44 drives the X-axis carriage 30 along the rails. It will be recognized that the rail 24 having the rack 38 comprises a reference rail relative to which the X-axis positioning of the X-axis carriage is performed. No attempt is made to determine or control the X-axis positioning of the carriage relative to the other rail 22.

Figure 4:
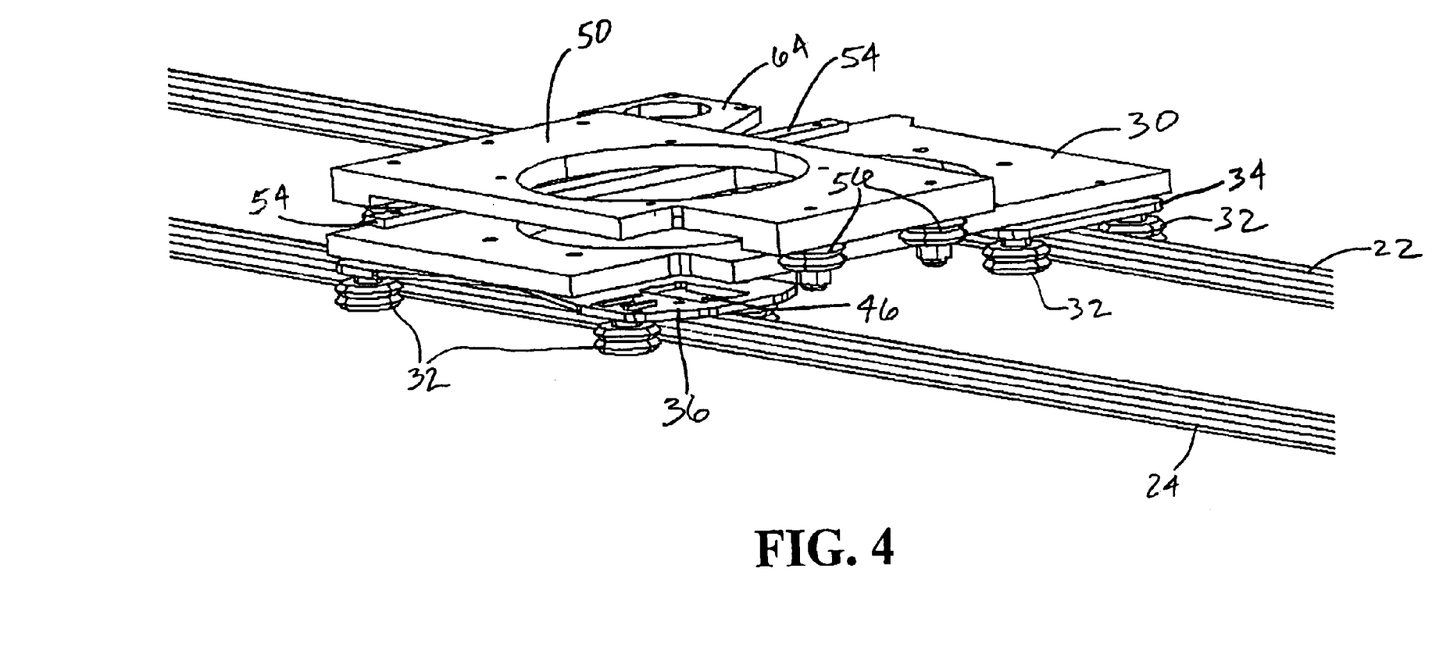
FIG. 4 is a perspective view showing the assembly of the X-axis carriage and Y-axis carriage in engagement with the rails, generally from above.

It is important for accurate control of the X-axis position of the X-axis carriage that the pinion gear 44 have a constant height relative to the rack 38 at any point along the reference rail 24. To accomplish this height control, the rotation axis of the pinion gear 44 preferably lies in the same plane as that defined by the rotational axes of the two rollers 32 mounted on the end of the spring plate 36. More particularly, the axes of the rollers 32 are parallel to each other and substantially normal to the workpiece surface, and the axis of the pinion gear 44 is substantially parallel to the workpiece surface and lies in the plane of the roller axes.

A Y-axis carriage 50 is slidably mounted atop the X-axis carriage 30 so that the Y-axis carriage can slide back and forth along a Y-axis direction perpendicular to the X-axis direction. More particularly, a pair of rails 52, 54 are affixed to the opposite edges of the X-axis carriage 30, and rollers 56 are mounted on the Y-axis carriage for engaging the rails 52, 54. A rack 58 for a rack and pinion arrangement is affixed to the X-axis carriage along the edge thereof adjacent to the rail 54 (see FIG. 5). A motor 60 and associated gearbox 62 are mounted on a plate 64 that is affixed to the Y-axis carriage adjacent to the rack 58. The plate 64 includes a window therethrough, and the output shaft of the gearbox 62 extends through the window and drives a pinion gear 66 that engages the rack 58. Thus, rotation of the pinion gear 66 drives the Y-axis carriage along the rails 52, 54 in the Y-axis direction.

Figure 2:
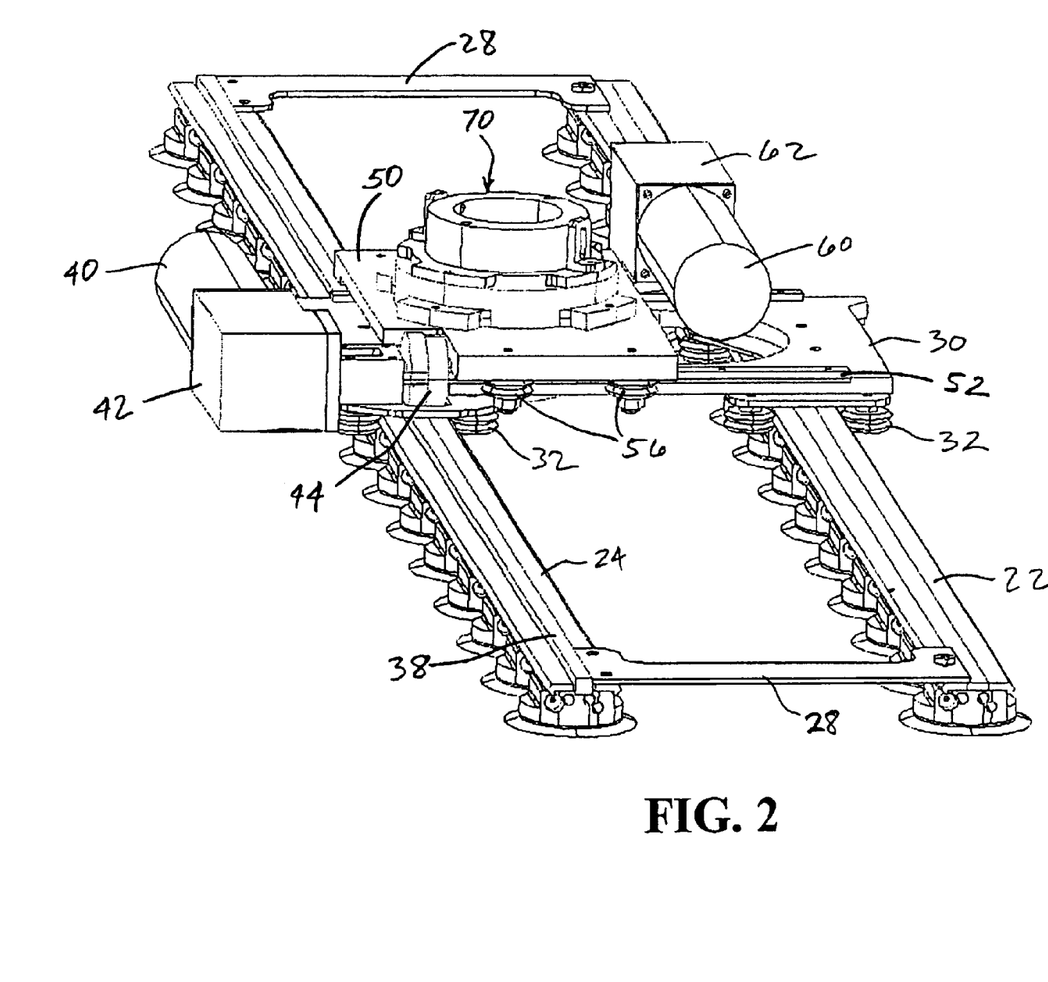
FIG. 2 is a perspective view of the machine with the drill spindle removed.
Figure 3:
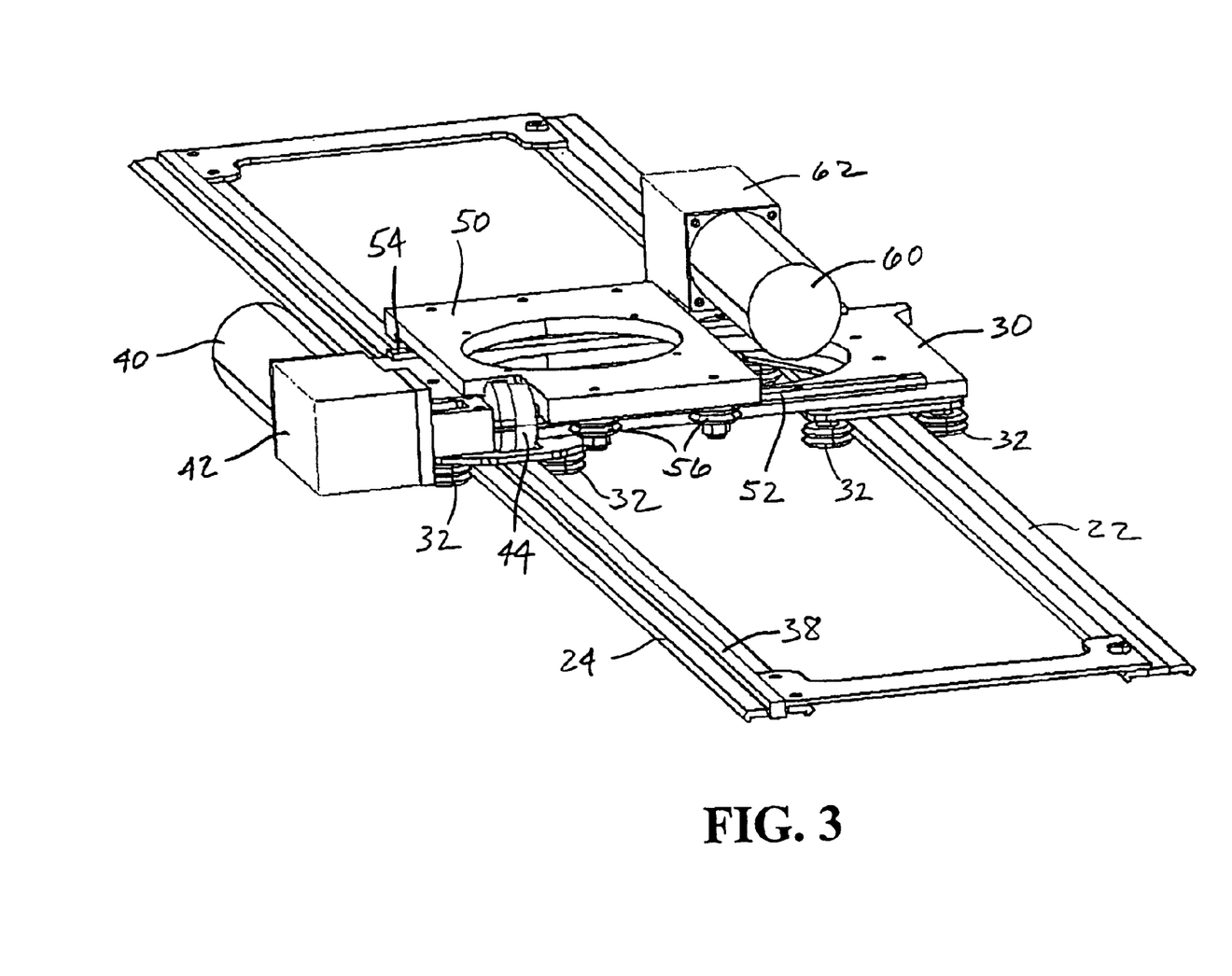
FIG. 3 is a perspective view similar to FIG. 2, but without the vacuum cups and without the mounting elements for the drill spindle.
Figure 6:
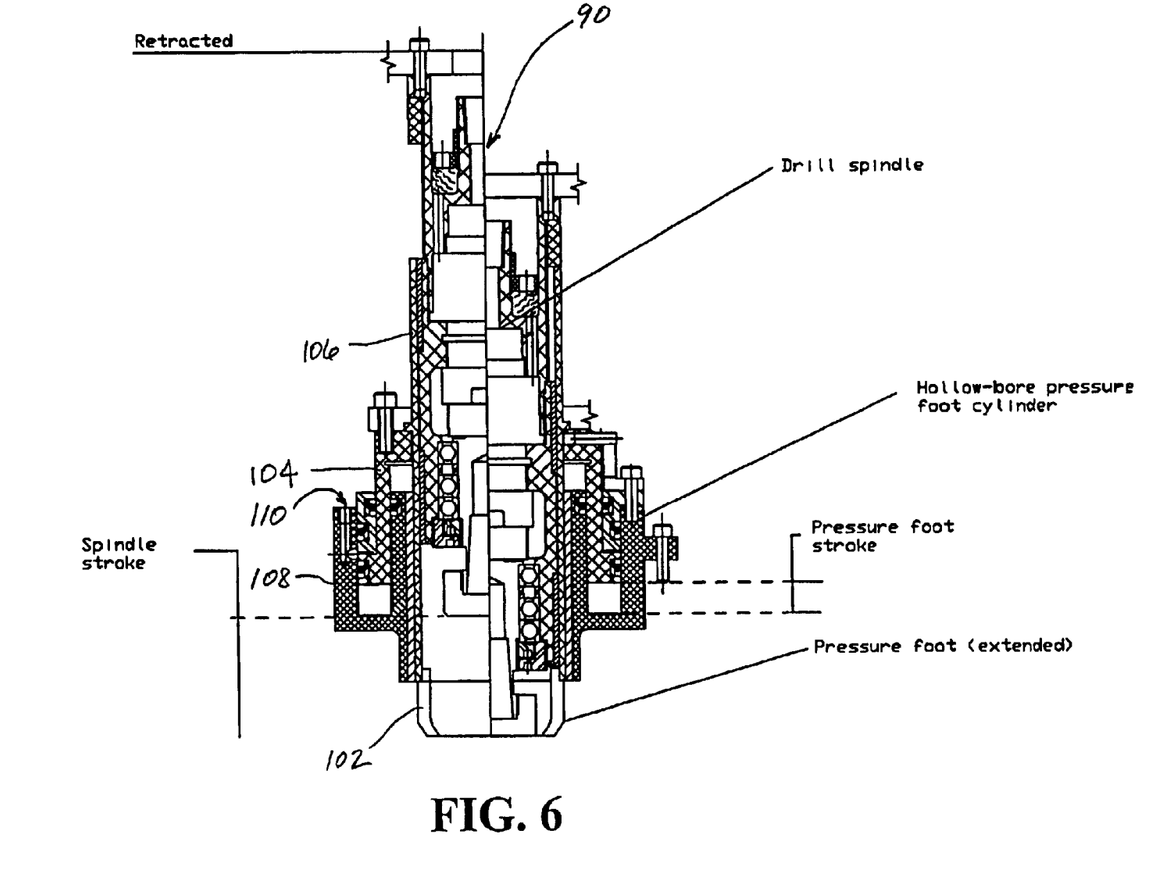
FIG. 6 is a cross-sectional view through the drill assembly of the machine.

Mounted atop the Y-axis carriage is a clamp ring assembly 70, best seen in FIG. 2. The clamp ring assembly supports and secures a drill assembly 80 as shown in FIG. 1. The drill assembly 80 includes a drill spindle 90. FIG. 6 depicts a portion of the drill assembly in cross-section, with the drill spindle 90 shown in a retracted position on the left-hand side of the figure and in an advanced position on the right-hand side of the figure. The drill spindle extends through a window in the Y-axis carriage 50 (visible in FIGS. 3 and 4), and through a window in the X-axis carriage 30 (visible in FIG. 5) that is elongated in the Y-axis direction. The drill spindle is retracted and advanced by a pair of fluid cylinders 92 (FIG. 1) the cylinder portions of which are affixed to the drill spindle. More specifically, the cylinders 92 are connected between a pair of plate members 94, 96 that are affixed to the spindle. The rods of the cylinders extend through apertures in the lower plate member 96 and attach to a plate member 98 that is affixed to the clamp assembly 70 on the Y-axis carriage. Thus, retraction of the rods into the cylinder portions causes the drill spindle to be advanced toward the workpiece, and extension of the rods causes the drill spindle to be retracted away from the workpiece. In this manner, a hole can be drilled in the workpiece with a rotary drill bit (not shown) mounted in the drill spindle. The axis of the drill along which the spindle is advanced and retracted is parallel to the reference axis of the X-axis carriage 50, i.e., normal to the plane of the carriage, and hence is substantially normal to the workpiece surface.

The machine also preferably includes a hydraulic check cylinder 100 shown in FIG. 1, for controlling the speed of advancement of the drill spindle. The check cylinder is connected between the plate member 98 and the assembly of the plate members 94, 96 and fluid cylinders 92, and acts as a damping device to limit the advancement speed of the spindle.

With reference to FIG. 6, the drill assembly includes a pressure foot 102 that is extendable to bear against the workpiece surface in a direction substantially normal thereto so as to exert a pre-load between the workpiece and the drill. A piston 104 surrounds and is affixed to the body 106 of the drill. The piston 104 is received into an annular space defined in a cylinder 108 that surrounds and is affixed to the clamp ring assembly 70 on the Y-axis carriage. The pressure foot 102 is also affixed to the body 106 of the drill. The piston 104 and cylinder 108 include seals as shown, such that a working chamber is defined in the piston-cylinder unit, which can be pressurized via an inlet port 110 to cause the piston 104 to be urged downward in FIG. 6, thus urging the drill downward and urging the pressure foot 102 against the workpiece surface. The pre-load exerted by the pressure foot against the workpiece preferably is of a greater magnitude than the maximum expected reaction force caused by the drill thrust during drilling of a hole. The drill thrust reaction force acts in a manner tending to reduce the pre-load between the pressure foot and the workpiece; stated differently, all drill thrust is reacted through the pressure foot. By pre-loading with a force greater than the expected maximum drill thrust, undesirable spindle movement can be minimized during drilling.

Figure 7:
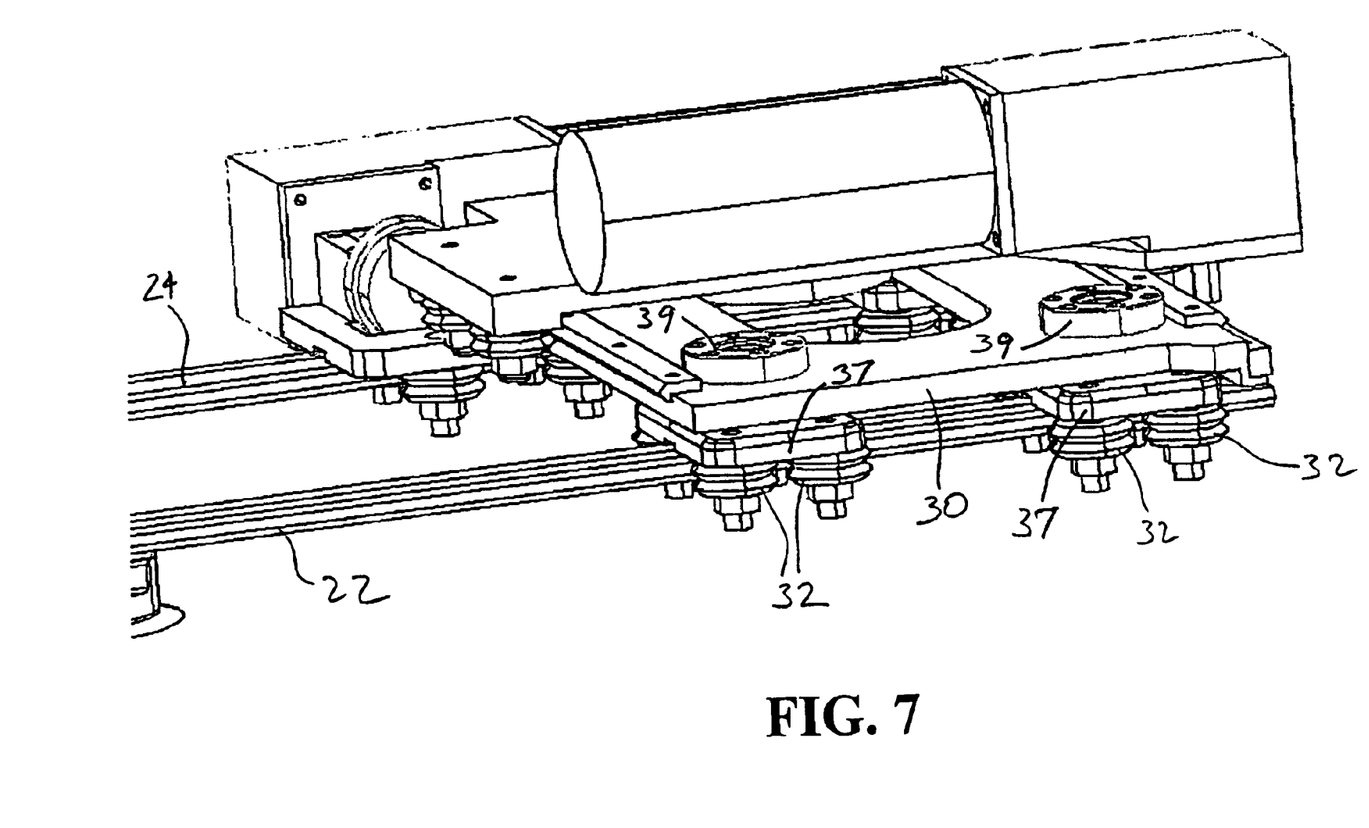
FIG. 7 is a perspective view of an alternative embodiment of the invention.

An alternative embodiment of the invention is shown, in partial assembly, in FIG. 7. This embodiment is similar to the previously described embodiment, except that instead of mounting the rollers 32 on spring plates 34, 36, the rollers 32 are mounted on bearing cars 37. Two bearing cars 37 are mounted to each of the opposite side edges of the X-axis carriage 30. Each bearing car 37 has two pairs of opposed rollers 32 that receive the respective rail 22 or 24 therebetween. The bearing cars 37 are attached to the X-axis carriage 30 by spherical bearings 39 that permit rotational movement of the bearing cars relative to the X-axis carriage. The bearing cars 37 and spherical bearings 39 thereby provide the relative movement that the spring plates 34, 36 provide in the previous embodiment.

In accordance with the invention, the compound-contoured three-dimensional surface of the workpiece is transformed or mapped to a planar or flat pattern such that a curvilinear distance between two points on the workpiece surface equates to a linear distance between corresponding points on the flat pattern. More specifically, the three-dimensional representation of the workpiece surface is transformed such that each point (x, y, z) on the workpiece surface is transformed into a corresponding point (X, Y) on the flat pattern. The drill is then positioned along the workpiece surface so that drilling will occur at a desired point $(x_1, y_1, z_1)$ by positioning the drill to intersect the point $(X_1, Y_1)$ on the flat pattern that corresponds to the point $(x_1, y_1, z_1)$. A numerical controller for the X-axis and Y-axis drive motors is programmed in the two-dimensional axis system of the flat pattern. The X and Y coordinates in the flat pattern generally correspond to the X- and Y-axes along which the carriages travel, but the correspondence in general will not be exact and a reference point is needed to calibrate the machine coordinates to those of the flat pattern.

To establish the relation between the flat pattern and the machine axes, two locating holes are drilled into the workpiece at known locations, one at each end of a zone of the workpiece to be operated upon. The apparatus is attached to the workpiece such that a line connecting the two locating holes is approximately parallel to the X-axis defined by the rails and so that the locating holes are within the X-Y working envelope of the apparatus. The drill spindle is removed from the apparatus and a laser edge finder (not shown) is installed in its place. The X- and Y-axis drive motors are operated to position the carriages until the laser edge finder detects one of the locating holes, and the X and Y coordinates for the hole are stored in memory, and the process is repeated for the other locating hole. The coordinates of the locating holes in the frame of reference of the workpiece (as transformed into the flat pattern) are known. Thus, a coordinate transformation is performed to relate the machine X,Y coordinates to the workpiece coordinates in the flat pattern, so that the machine can be positioned at any desired point of the workpiece by controlling the X and Y drive motors to position the machine at the corresponding X,Y point.

Many modifications and other embodiments of the invention will come to mind to one skilled in the art to which this invention pertains having the benefit of the teachings presented in the foregoing descriptions and the associated drawings. For example, while the rails 22, 24 in the illustrated embodiment achieve relative flexibility about one axis and relative stiffness about a perpendicular axis by virtue of their widths being much greater than their thicknesses, it will be recognized that there are other ways of achieving this characteristic. As an example, the rails could be made of a material having different moduli of elasticity in different directions, such as composite materials, or the cross-sectional shape of the rails could be designed to impart the differential flexibility. Furthermore, while rollers 32 are shown for engaging the rails, other types of members could be used instead of rollers for engaging the rails to facilitate sliding of the carriage 30 therealong, such as slide blocks or the like. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for guiding and positioning a machine component relative to a surface of a workpiece, the apparatus comprising:

first and second elongate flexible rails, the rails being spaced apart and approximately parallel to each other;

a plurality of vacuum attachment devices connected to each rail and spaced at intervals therealong for releasably attaching each rail to the surface of the workpiece by vacuum, with the widths of the rails extending substantially parallel to the surface of the workpiece, the rails bending and twisting as needed to substantially follow the surface of the workpiece; and     an X-axis carriage structured and arranged to support the machine component, the X-axis carriage slidably engaging the rails and being traversable along the rails so as to position the machine component relative to the workpiece, wherein the X-axis carriage is flexibly connected to the rails.

2. The apparatus of claim 1, wherein each rail is relatively stiff in bending about a first bending axis and relatively flexible in bending about a second bending axis orthogonal to the first bending axis, and each rail is mounted on the workpiece such that the first bending axis is substantially normal to the workpiece surface and the second bending axis is substantially parallel to the workpiece surface.

3. The apparatus of claim 1, further comprising a connecting member connected between the rails at a location therealong to substantially fix a spacing distance between the rails at said location, the rails having freedom to move toward and away from each other at other locations remote from said location.

4. The apparatus of claim 1, wherein the attachment devices comprise vacuum cups.

5. The apparatus of claim 1, wherein the X-axis carriage is connected to the rails by flexible mounts.

6. The apparatus of claim 5, wherein the flexible mounts comprise plate-shaped springs.

7. The apparatus of claim 6, further comprising an X-axis drive device for driving the X-axis carriage along the rails, the X-axis drive device being mounted on one of the plate-shaped springs.

8. The apparatus of claim 7, wherein the X-axis drive device includes a drive member that engages a cooperating member on one of the rails.

9. The apparatus of claim 8, wherein the drive member extends through an aperture in the plate-shaped spring.

10. The apparatus of claim 1, wherein the X-axis carriage is slidably connected to the rails by rotary members that have a rolling engagement with the rails.

11. The apparatus of claim 10, wherein the rotary members are mounted on flexible mounts that are affixed to the X-axis carriage and can flex relative to the X-axis carriage to accommodate varying bending and twisting of the rails.

12. The apparatus of claim 1, further comprising a drill mounted on the X-axis carriage.

13. The apparatus of claim 12, further comprising an actuator connected to the X-axis carriage and a pressure foot coupled with the actuator, the actuator being operable to press the pressure foot against the workpiece surface generally normal thereto so as to exert a pre-load force between the workpiece and the X-axis carriage.

14. The apparatus of claim 13, wherein the pressure foot is connected with the drill such that a reaction force caused by drill thrust during drilling of the workpiece is reacted through the pressure foot so as to reduce the pre-load force between the pressure foot and the workpiece.

15. The apparatus of claim 14, wherein the drill is mounted on a Y-axis carriage that is slidable on the X-axis carriage along a Y axis, and wherein the actuator is connected between the Y-axis carriage and the drill.

16. The apparatus of claim 15, wherein the actuator comprises a plurality of fluid-operated cylinders.

* * * * *